United States Patent [19]

Kikuchi et al.

[11] Patent Number: 5,129,074
[45] Date of Patent: Jul. 7, 1992

[54] DATA STRING STORAGE DEVICE AND METHOD OF STORING AND RETRIEVING DATA STRINGS

[75] Inventors: Takashi Kikuchi, Akishima; Hiroshi Fukuta, Kodaira; Nobuo Saito, Mitaka; Oichi Atoda, Tokorozawa, all of Japan

[73] Assignee: Hitachi VLSI Engineering Corporation, Tokyo, Japan

[21] Appl. No.: 409,672

[22] Filed: Sep. 20, 1989

[30] Foreign Application Priority Data

Sep. 22, 1988 [JP] Japan .................. 63-236451

[51] Int. Cl.⁵ .............. G11C 15/00; G06F 13/00; G06F 15/16
[52] U.S. Cl. ......................... 395/425; 365/49; 364/228; 364/457; 364/263; 364/DIG. 1
[58] Field of Search ................ 365/230.03, 220, 49; 395/425; 364/200 MS File, 900 MS File

[56] References Cited

U.S. PATENT DOCUMENTS

| | | | |
|---|---|---|---|
| 4,330,843 | 5/1982 | Lawson, II | 364/900 |
| 4,523,276 | 6/1985 | Maejima et al. | 364/200 |
| 4,546,432 | 10/1985 | Umemura et al. | 364/200 |
| 4,570,220 | 2/1986 | Tetrick et al. | 364/200 |
| 4,777,622 | 10/1988 | Palm et al. | 365/49 |
| 4,809,161 | 2/1989 | Torii et al. | 364/200 |
| 4,903,234 | 2/1990 | Sakuraba et al. | 365/49 |
| 4,989,145 | 1/1991 | Kyushima | 364/419 |
| 5,003,469 | 3/1991 | Kamiyama et al. | 364/200 |

FOREIGN PATENT DOCUMENTS 61-177700  8/1986  Japan .
62-209617  9/1987  Japan .

*Primary Examiner*—Michael R. Fleming
*Assistant Examiner*—Gopal C. Ray
*Attorney, Agent, or Firm*—Fay, Sharpe, Beall, Fagan, Minnich & McKee

[57] ABSTRACT

A data storage device for storing data strings each including units of data has a plurality of memory sections each for storing therein a table, a plurality of processor elements one provided for each of the tables and a controlling unit having an internal memory in which data strings are stored. The table contains a plurality of records each including a unit of data, a first index data representative of the number of units of data of a data string which the unit of data constitutes and a second index data unique to each individual data string. The processor elements access in parallel their associated tables under control of the control unit for data storage and data retrieval. The first and index data are generated by the controller for the purpose of data storage. For retrieval of data strings: a key data string is divided into units of data; retrieval keys are produced each from a combination of one of the divided units of data and a third index data representing the number of units of data of the key data string; second index data are retrieved in parallel in the tables of the data storage device with the retrieval keys so that a single second index data common to all of the retrieved second index data is found among them; and a data string corresponding to the found common second index data is outputted from the internal memory of the storage device.

8 Claims, 12 Drawing Sheets

{EDIBLE (RAW, SWEET, X)}

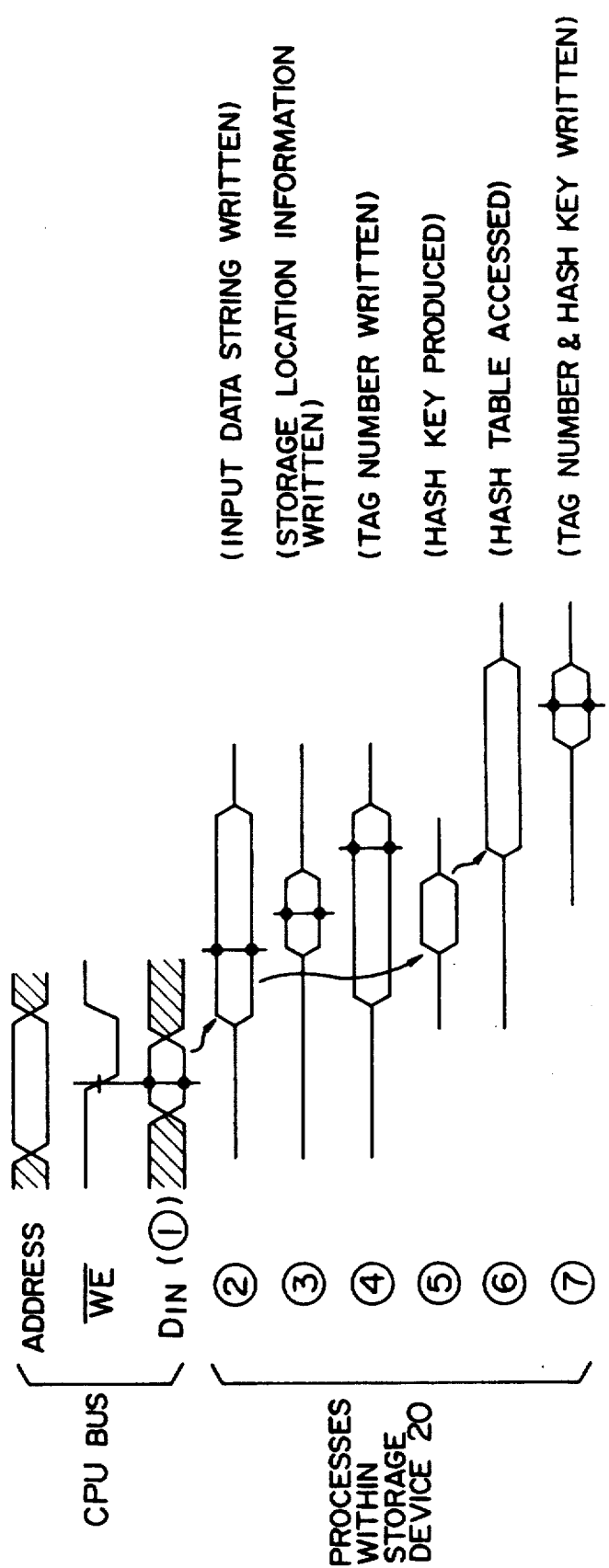

F I G. 10
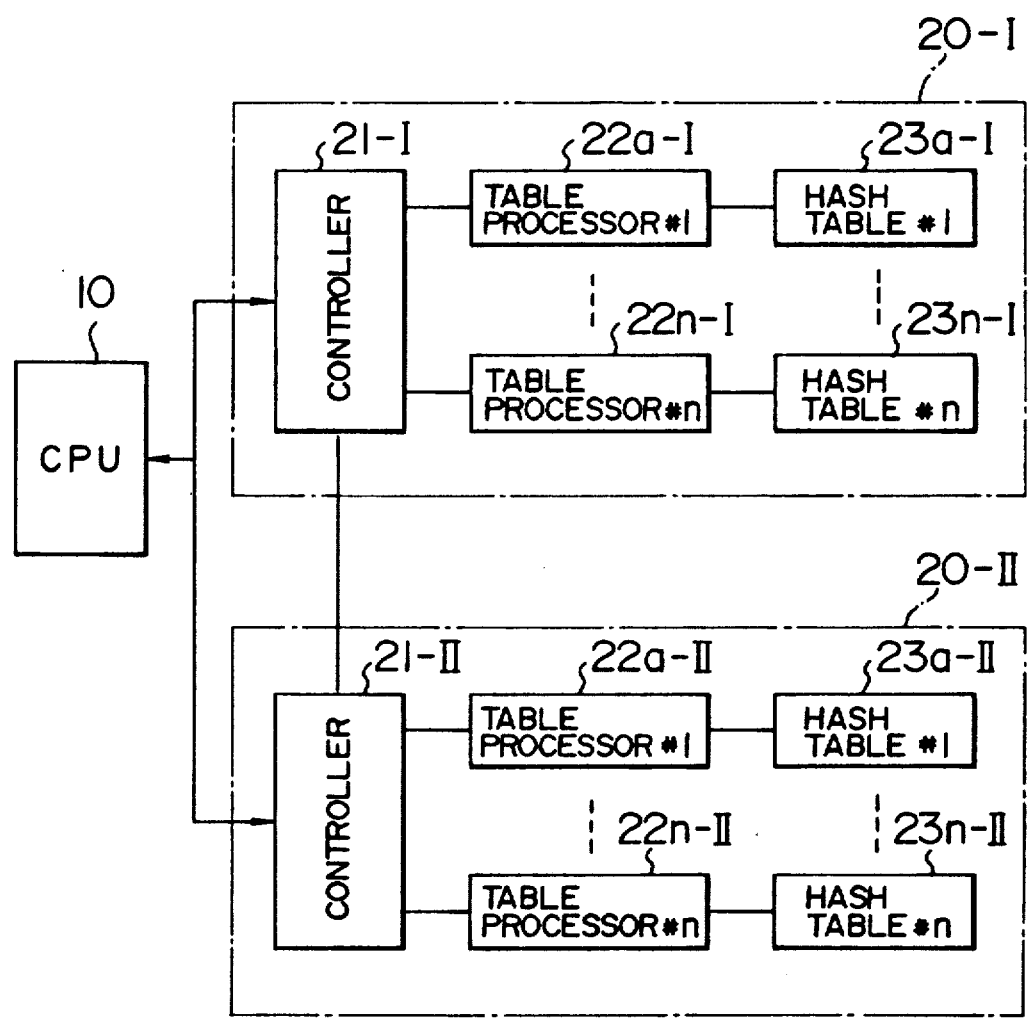

DATA STRING STORAGE DEVICE AND METHOD OF STORING AND RETRIEVING DATA STRINGS

BACKGROUND OF THE INVENTION

The present invention relates to data storage techniques, and more particularly to a data storage technique useful for processing data strings represented by a language (a logic type language such as PROLOG or LISP) with which inference is possible, and to semiconductor data storage devices which can be readily implemented in the form of a large scale integrated circuit.

Various types of data storage devices have been known which are employed in a general purpose computer, a work station, a translation machine or the like. For example, different kinds of RAMS (Random Access Memories) made of integrated semiconductors are reported in literatures, for example, "Semiconductor Handbook", OHM-sha, Nov. 30, 1977, pp. 753-763.

In the RAM described in the above literature, addressing is made to plural storage cells respectively so that data are written in and read out from those storage cells which are addressed.

According to the above-described conventional technique, data sets, which represent the knowledge and inference rules required for the process of the logic type language used for an artificial intelligence or the like, are stored in the conventional general purpose RAM or an auxiliary memory unit, retrieval of a data set having a specific format and content for unification (referred to simply as "retrieval of unification candidate clause" hereinafter) and management of the data sets are carried out by a CPU using a software. Therefore, the retrieval of unification candidate clause requires a large amount of time, and the processing speed and the throughput of the logic type language processing system cannot be improved.

Further, JP-A-62-209617 (laid open on Sep. 14, 1987) discloses a retrieval stystem in which knowledge representation is accomplished in the form of frames and use is made of a hash table for high speed retrieval. JP-A-61-177700 (laid open on Aug. 9, 1986) discloses a multi-association memory having a hardware for retrieval of data strings hit by a plurality of retrieval keys.

SUMMARY OF THE INVENTION

It is an object of the present invention to provide a data stroage device and a stroage method in which a plurality of data strings each including a plurality of units of data are stored so that the stored data strings can be retrieved at a high speed.

Another object of the present invention is to provide a system and a method for storing and retrieving a plurality of data strings each including a plurality of units of data.

According to one aspect of the present invention, data storage into a storage device and data retrieval from the storage device are carried out in the unit of a data string in the description of information using a language (a logic type language such as PROLOG or LISP) of the type capable of inference, that is, in the unit of a data string including a plurality of units of data.

The data storage device has a plurality of memory sections, a plurality of processor elements one provided for each of the memory sections and a controlling unit having an internal memory in which data strings are stored. The memory sections store a plurality of records each including a unit of data, a first index data representative of the number of units of data of a data string which the unit of data constitutes and a second index data unique to each individual data string. The processor elements access in parallel their associated memory sections under control of the control unit for data storage and data retrieval. The first and second index data are generated by the controller for the purpose of data storage. For retrieval of data strings: a key data string supplied from, e.g., a CPU to the storage device is divided into units of data; retrieval keys are produced each from a combination of one of the divided units of data and a third index data representing the number of units of data of the key data string; second index data are simultaneously retrieved in the tables of the data storage device with the retrieval keys so that a single second index data common to all of the retrieved second index data is found among them; and a data string corresponding to the found common second index data is outputted from the internal memory of the storage device.

According to the above-described construction, the retrieval is carried out by a hardware at a high speed independent of the CPU, the traffic of data between the CPU and the storage device being remarkably reduced, so that the throughput of the process of data represented by the logic type language can be improved.

Furthermore, the data is stored in the storage device in accordance with the data structure suitable for retrieving the data and data retrieval is effected in a hardware, whereby the retrieval can be carried out at a high speed.

The present invention is described hereinafter with reference to embodiments of the invention.

The storage devices according to embodiments described below are suitable for implementation by the use of semiconductor IC techniques. The storage devices can be constructed in a small size and at low cost with the great advance of the recent semiconductor LSI techniques. However, the semiconductor storage devices which are preferred embodiments of the invention may be replaced by other storage devices having other construction in view of the essential of the embodiments described below.

BRIEF DESCRIPTION OF THE DRAWINGS

FIGS. 5A and 5B are explanatory diagrams useful for explaining the storing operation of the storage device shown in FIG. 3.

FIG. 10 is a diagram showing a data storage/retrieval system according to one embodiment of the present invention.

DESCRIPTION OF THE PREFERRED EMBODIMENTS

Figures 1, 4:
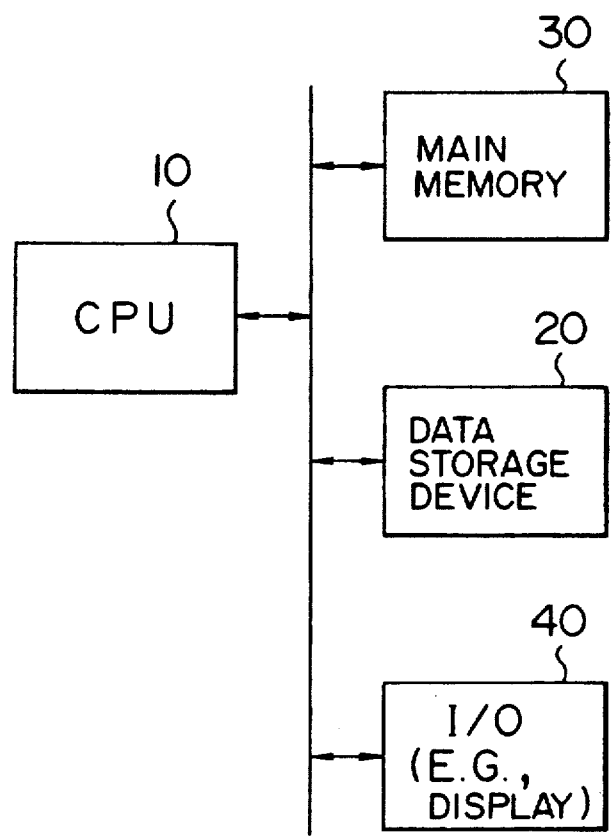
FIG. 1 is a schematic view of a construction of a system for a workstation, a general purpose computer or the like to which the present invention is applied.
FIG. 4 is a diagram showing one example of a data string stored/retrieved in a storage device.

FIG. 1 shows one example of a system construction for a work station or a general purpose computer to which the present invention is applied. Conventionally, part of an operating system, an application program, variable data, knowledge data base and the like are collectively stored in a main memory 30. On the other hand, according to the system shown in FIG. 1, the knowledge data base is stored in a data storage device 20 installed in the system independent of the main memory 30, so that data retrieval can be carried out at a high speed and the throughput is improved. A CPU 10 supplies retrieval input data strings for retrieving data (retrieval data strings) to the data storage device 20. The data storage device 20 retrieves data, as described hereinafter in detail. The CPU 10 receives the retrieval result from the data storage device 20. A reference numeral 40 represents a peripheral unit such as a display or the like.

Figure 2:
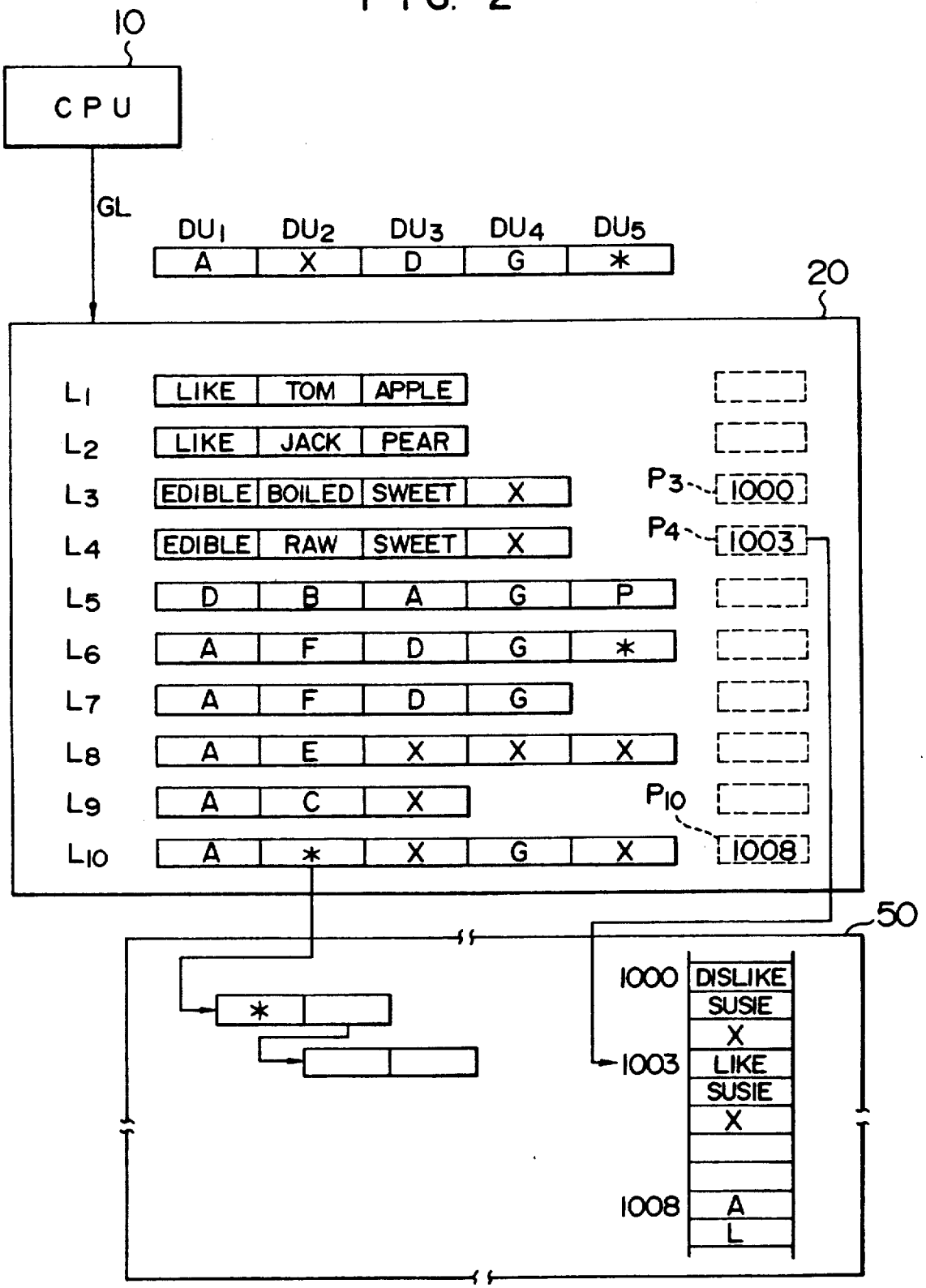
FIG. 2 is a diagram showing the principle of operation of a storage device according to one embodiment of the present invention.

FIG. 2 is a diagram showing the principle of operation of the storage device according to one embodiment of the present invention.

In a logic type language processing system, a great number of data strings or clauses, each of which represents knowledge such as "{LIKE (TOM, APPLE)}", or inference rules described with clauses such as "IF {EDIBLE (RAW, SWEET, ×)} THEN {LIKE (SUSIE, ×)}" are stored in the storage device. The words "LIKE", "TOM" and the like used in the above clauses are coded to specific constants respectively predetermined. Symbol "×" is a variable which is substitutable by any constant. A combination such as indicated by bracket "{}" including units of data or items (constant data and/or variable data) is called a data string or clause.

Inference using the logic type language may be, for example, carried out as described below. Knowledge, for example, "{LIKE (TOM, APPLE)}" is retrieved from stored knowledge and stored inference rules on the basis of knowledge "{LIKE (TOM, ×)}" to thereby obtain "×=apple". Alternately, stored data strings are searched on the basis of retrieval key "{EDIBLE (RAW, SWEET, ORANGE)}" to obtain "IF {EDIBLE (RAW, SWEET, ×)} THEN {LIKE (SUSIE, ×)}" and then, by putting "×=ORANGE" to unify the clauses, a conclusion "{LIKE (SUSIE, ORANGE)}" is obtained.

The above-described retrieving rule is called a pattern matching rule.

The storage device 20 as shown in FIG. 2 stores a large number of single data strings each representing knowledge or a clause $L_1$, $L_2$, $L_5$–$L_9$ and/or a large number of data strings constituting "if clause" (referred to as leading data string hereinafter) $L_3$, $L_4$ and $L_5$ representing inference rules. Data strings constituting the "then clause" of the inference rules may be stored in a conventional external storage device because the data string may not relate to the retrieval. The storage device as shown in FIG. 2 stores pointer $P_3$, $P_4$ and $P_{10}$ (for example, hexadecimal 4 digit data or binary or decimal data having an arbitrary number of digits) for accessing the external storage device along with the leading data strings, as shown by broken lines in FIG. 2. The above data strings in the "then clause" are stored in an external storage device 50. The external storage device 50 may be a part of the memory area of the main memory 30 shown in FIG. 1.

For data retrieval, a retrieval input data string GL instead of addresses is given to retrieve, among stored data strings, only those data strings which have the same number of units of data or items as the retrieval input data string GL and have, at the same time, the contents of the units of data satisfying the following matching rules with respect to the contents of the units of data at corresponding locations in the retrieval input data string GL.

In the collation between one unit of data in the retrieval input data string GL and a unit of data at a corresponding location in one stored data string:

(1) if at least one of the unit data is a variable, the two units of data are identical or coincident with each other; and (2) if the two units of data are constants having same vale, the two units of data are identical or coincident with each other.

Accordingly, if, for example, "{EDIBLE (RAW, SWEET, ORANGE)}" is applied from the CPU 10 as the retrieval input data string GL, the data string $L_4$ {EDIBLE (RAW, SWEET, ×)} and the accompanying pointer $P_4$"1003" is read out. However, other data strings such as "{EDIBLE (BOILED, SWEET, ×)} (data string $L_3$), "{A (F, D, G,)}" (data string $L_7$) not satisfying the matching rules are not read out.

In the data having the logic type language structure, that is, the data described with a language of the type which is capable of inference, the constant for a unit of data may be a list or the like. The list or the like may not be stored in the storage device 10 in view of efficient utilization of the storage area. Therefore, the list or the like is stored in the external storage device 50, and the device 20 stores the pointers representing the stored locations of the list information in the storage device 50 as the pointer items. In FIG. 2, the pointer item is represented by an asterisk "*". If the storage capacity is made large, the list information may be stored in the storage device 20. If the pointer item is included in one of the stored data strings, the content of the list or the like must be checked as to whether retrieval actually results in a pattern matching. However, since the check cannot be carried out in the storage device, for further matching rules described below, for example, are added to the above-mentioned matching rules, and all data strings, which satisfy the pattern matching rules, are read out from the storage device 20.

In the collation between one unit of data of the retrieval data string GL and a unit of data at corresponding location in one stored data string:

(3) if both of the two units of data are pointer items, they are identical or coincident with each other; and (4) if one of the units of data is a constant and the other unit of data is a pointer item, they are not identical or coincident with each other.

Therefore, in the embodiment shown in FIG. 2, if data string "{A (×, D, G, *)}" is applied as a retrieval data string GL, the data strings to be read are apparently three data strings $L_6$, $L_8$ and $L_{10}$.

As described above, the operational burden on the CPU 10 of retrieving of data strings and determining possibility of unification of data strings can be remarkably reduced owing to the fact that a retrieval input data string GL is directly supplied from the CPU while only data strings pattern-matched are read out among those stored in the storage device 20. Namely, the traffic in the bus between the CPU 10 and the storage device 20 is remarkably reduced. In addition, to improve the total throughput of the system, retrieval in the storage device 50 should be carried out at a high speed. A hardware system and the data structure in the storage device for a high speed data retrieval will be described below.

Figure 3:
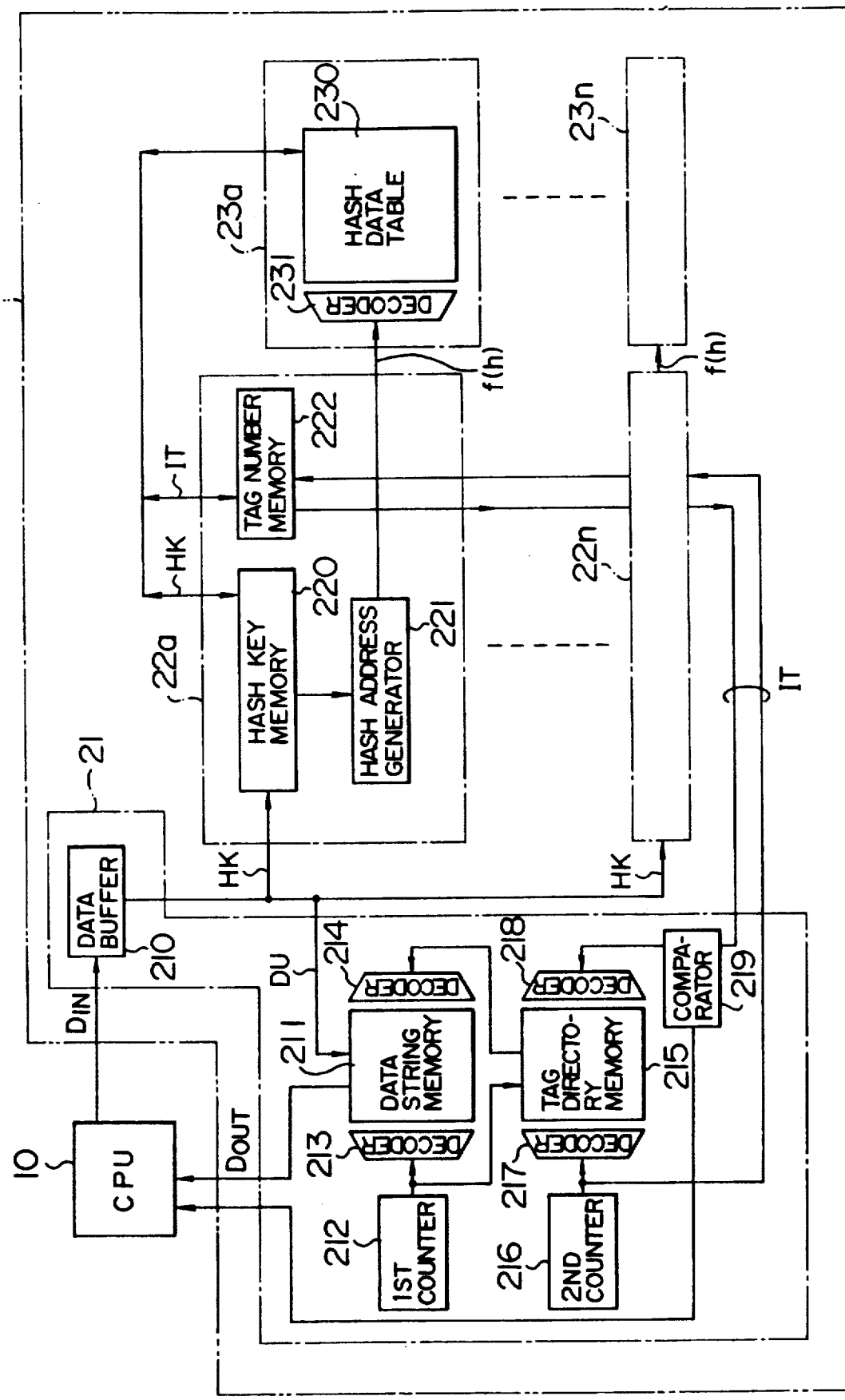
FIG. 3 is a diagram showing a hardware construction of a storage device according to one embodiment of the present invention.
Figure 5A:
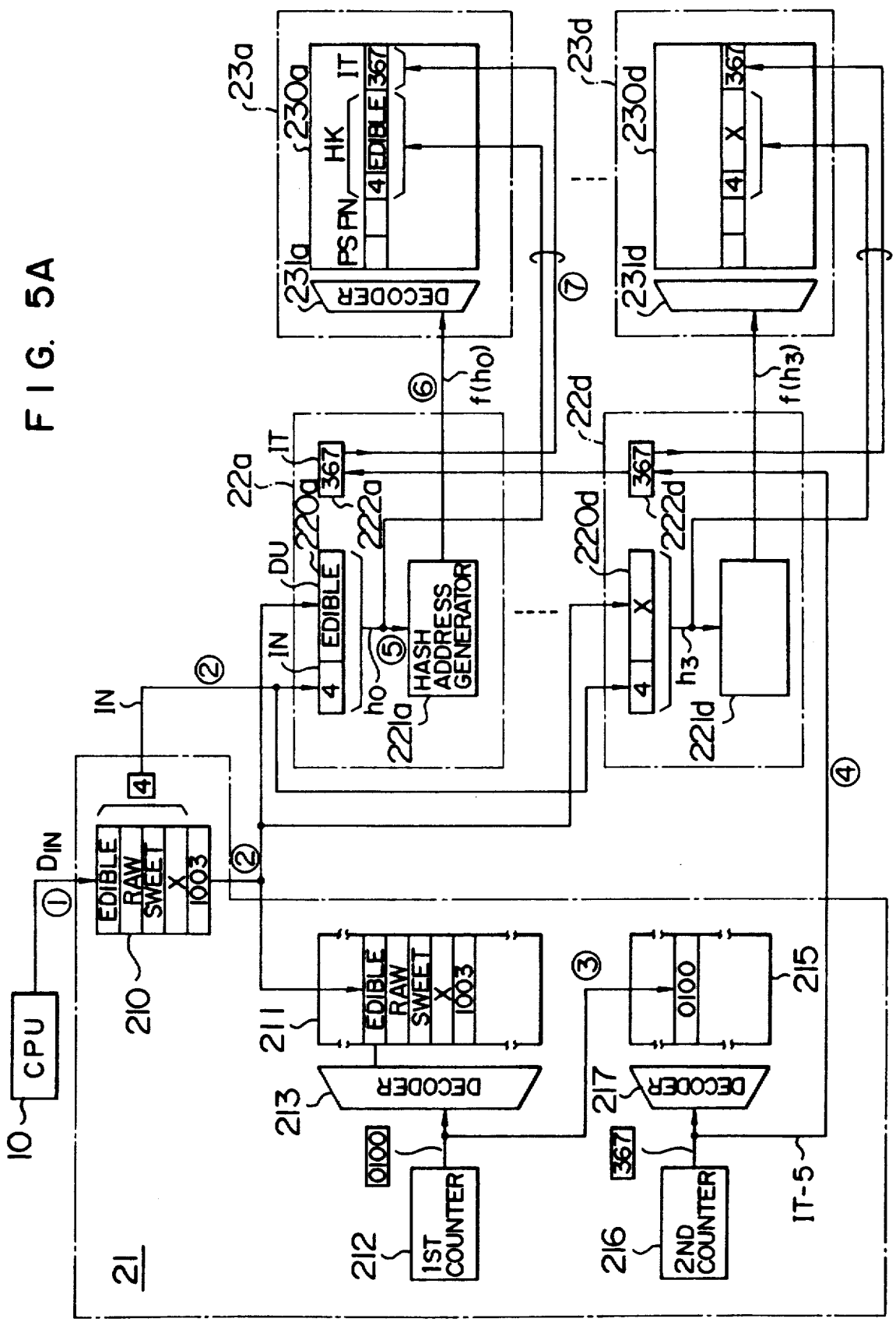

FIG. 3 shows the construction of the hardware of the storage device according to an embodiment of the invention. FIGS. 5A and 6B illustrating the data storage/retrieval operation of the storage device shown in FIG. 3 include an illustration of the manner of storing data strings in the storage device.

Referring to FIG. 3, the storage device 20 comprises control means 21 which may be associated with the CPU 10 to receive data therefrom and send data thereto, hash tables $23a$, $23b$, ..., $23n$ respectively stored in a plurality of memory sections, and processor elements or table processors $22a$, $22b$, ..., $22n$ capable of accessing the hash tables $23a$, $23b$, ..., $23n$ in parallel under the control of the control means 21 in order to store and retrieve the information or data in the hash tables or memory sections.

The control means 21 comprises a controller including a data buffer 210 for temporarily storing a data string supplied from the CPU 10 in data storing and retrieving operation modes, a comparator 219 operative in the data retrieving operation mode and first and second counters 212 and 216 operative for storing data strings in an inner memory or a data string memory, and an internal memory including the above-mentioned data string memory 211 (having a write decoder 213 and a read decoder 214) for storing data strings supplied from the data buffer 210 and a directory memory 215 (having a write decoder 217 and a read decoder 218) for storing a tag directory indicating a relationship between a below-described tag numbers (second index data) and the data strings.

Each of the table processors $22a$, ..., $22n$ has a hash key memory 220 for storing a hash key HK supplied from the data buffer 210, a hash address generator 221 for generating a hash address (hash function) f(h) on the basis of the hash key supplied from the hash key memory 220, and a tag number memory 222 for receiving a tag number from the tag directory memory 215 of the control means 21.

Each of the memory sections $23a$, $23b$, ..., $23n$ for storing hash tables comprises a has data memory 230 and a decoder 231 for converting a hash address from the hash address generator 221 to an address in the memory 230.

FIGS. 5A and 5B illustrate the data storing operation of the storage device 20 shown in FIG. 3.

Data strings Din to be stored in the storage device 20 are inputted from the CPU 10. The storage input data strings are assumed to include the information content as shown in FIG. 4. Each data string Din usually include information (unit of data) on contents of its data and information representative the number of its unit of data. For example, since one bus cycle for a data bus in the storage of the storage input data string Din in the storage device 20 may correspond to one unit of data, counting of the number of bus cycles for completion of input of the whole storage input data string Din will provide the information representative of the number of units of data. The data string Din is divided into units of data in the control means 21, and is temporarily stored in the data buffer 210 (①). Subsequently, the data string Din is stored in a storage location of the data string memory 211, which is designated by the first counter 212 (for writing) and is specified by the decoder 213 (②). Simultaneously with this writing operation, the control means 21 generates a first index data IN representing the number of the units of data on the basis of the information representative of the number of the units of data accompanied by the input data string Din from the CPU, combines the index data IN with each of the divided units of data, generates hash keys the number of which is the same as the number of the divided units of data, and stores the hash keys in the hash memories $220a$, ..., $220d$ of the individual table processors $22a$, $22b$, ..., $22d$ in parallel (simultaneously or sequentially) (②). Attributes of the data strings (for example, the priority between the data strings or the like) may be added to the hash keys. The output of the first counter 212 is supplied to the directory memory 215, stored in a storage location of the directory memory 215 specified by the decoder 217 and designated by the counter 216 of the second write counter 216 (③). The output of the second counter 216 serves as a second index data IT. This second index data IT being called a tag number is supplied to the tag number memories $222a$, ..., $222d$ in the respective table processor $22a$, $22b$, ..., $22d$ (④). The tag number IT may be divided into higher and lower order parts so that the higher order part may be a priority of an associated data string and the lower order part may be the second index data which is unique to individual data string. The hash address generators $211a$, $211b$, ..., $211d$ in the table processors $22a$, $22b$, ..., $22d$ generate hash addresses f(h_0), f(h_1), ..., f(h_3) from the hash keys stored in the has key memories $220a$, ..., $220d$ under the control of the controller means 21 (⑤). Each of the table processors $22a$, $22b$, ..., $22d$ stores an associated has key (HK) and the second index data or tag number (IT) in the storage locations of the memory sections $23a$, $23b$, ..., $23d$ (hash tables $230a$, $230b$, ..., $230d$) associated with the respective table processor (⑦), the storage locations being designated by the hash address generators $211a$, $211b$, ..., $211d$ and specified by the decoders $231a$, $231b$, ..., $231d$ under the control of the controller means 21 (⑥). A hash key (HK) (a unit of data + a first index data (IN)) and a second index data (IT) unique to each data string form a record to be stored in the hash table. It will be understood that each of the memory sections $23a$, $23b$, ..., $23d$ is always responsible for a unit of data of a predetermined location in a data string. In the above-described steps of procedure for the operation of storing data strings, it can be understood that the steps (②) to (⑦) do not deteriorate the throughput of the bus of the CPU because these steps are carried out in the storage device 20. FIG. 5B is a timing chart of the storage operation.

Figure 6A:
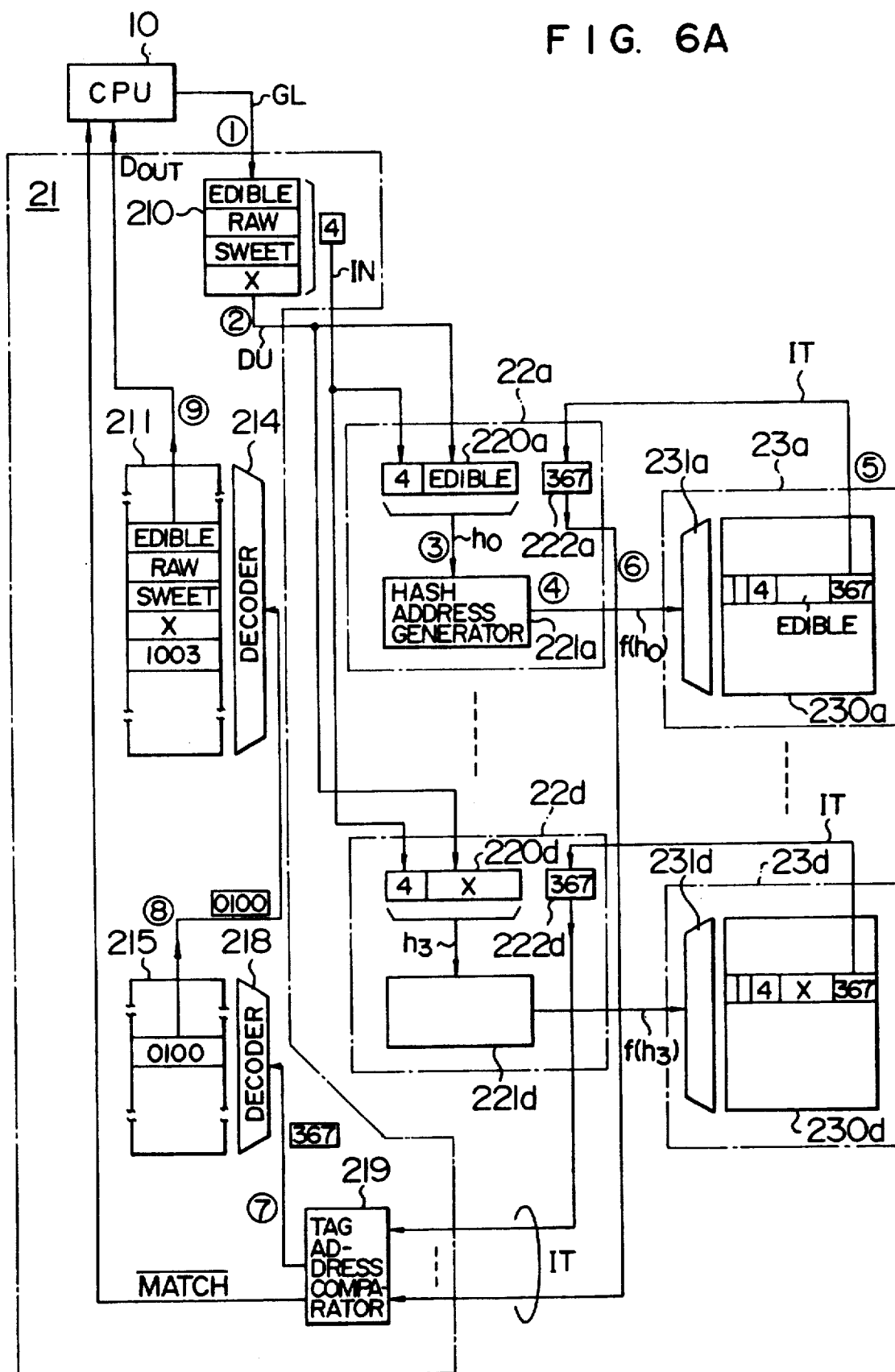
FIGS. 6A and 6B are explanatory diagrams useful for explaining the retrieving operation of the storage device shown in FIG. 3.
Figure 6B:
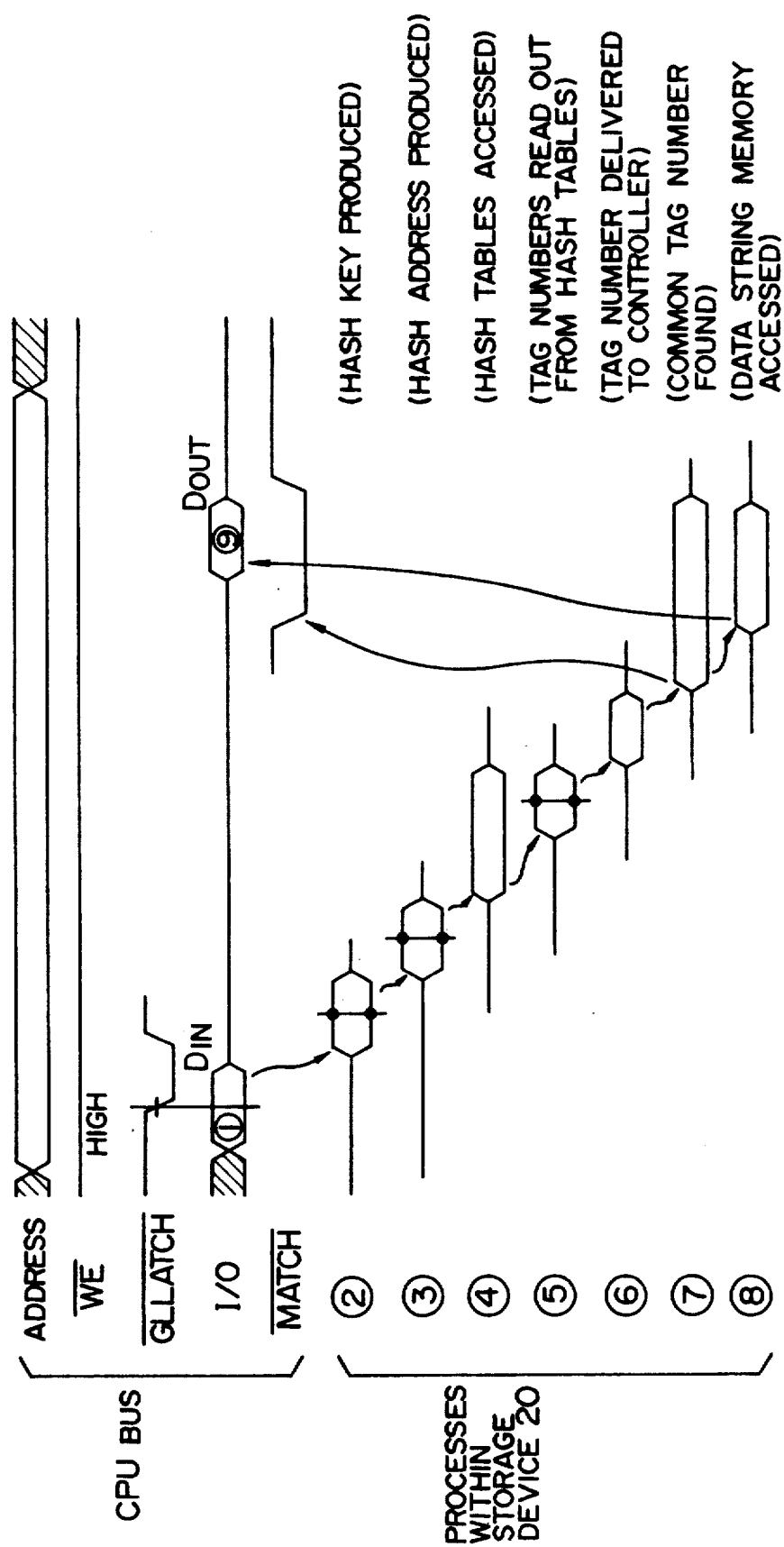

FIGS. 6A and 6B illustrate the data retrieving operation of the storage device 20 shown in FIG. 3.

A retrieval input data string GL for the retrieval in the storage device 20 are inputted from the CPU 10.

For convenience of explanation, the retrieval input data string GL is assumed to have a content of the information as shown in FIG. 4. The data string GL usually include information on the content of the data (unit of data) accompanied by information representative of the number of units of data, similarly to the case described with reference to the data string storage in the storage device 20 with reference to FIG. 5A. The control means 21 divides the data string GL into respective units of data, temporarily stores the respective units of data in the data buffer 210 (①). Further, the control means 21 detects the number of the units of data included in the input data string GL, generates the hash keys (HK) the number of which is the same as the detected number of units of data, each hash key including a combination of one of the divided units of data and a third index data IN representative of the number of the detected units of data, and stores the generated hash keys in the hash memories 220a, ..., 220d of the individual table processors 22a, 22b, ..., 22d in parallel (simultaneously) or sequentially (②). Subsequently, the hash address generators 211a, 211b, 211d in the table processors 22a, 22b, ..., 22d generate hash addresses $f(h_0), f(h_1), \ldots, f(h_3)$ from the hash keys stored in the hash key memories 220a, ..., 220d in the table processors 22a, 22b, ..., 22d under the control of the controller means 21 (③), to read out tag numbers for those records stored in the storage locations in the memory sections 23a, 23b, ..., 23d (the hash tables 230a, 230b, ..., 230d) (hash retrieval) which are sequentially designated by the hash addresses (④), and temporarily store the tag numbers in the tag number memories 222a, 222b, ..., 222d in the corresponding table processors 22a, 22b, ..., 22d (⑤). The above-described matching rules (1) to (4) are applied in the reading operation in accordance with the hash retrieval, to thereby read out tag numbers for the records each having a hash key coinciding with the hash key (HK) and read out tag numbers for records each having a variable and a first index data identical with the index data (third index data) constituting the hash key (HK). Each of the table processors 22a, 22b, ..., 22d supplies the temporarily stored tag numbers to the tag number comparator 219 under the control of the control means 21 (⑥). These tag numbers are compared with each other by the tag number comparator 219, and selected tag numbers are sequentially read out from selected hash tables until all tag numbers read out from the hash tables 230a, 230b, ..., 230d coincide with each other, as described hereinafter. When the coincidence of the tag numbers is detected in the tag number comparator 219, the coincident common tag number IT-5 (the data string corresponding to this tag number is a data string pattern-matching the retrieval input data string GL) is supplied to the tag directory 215 (⑦). The address signal of the data string corresponding to the common tag number, which represents the storage location in the internal memory, i.e., the data memory 211 is generated (⑧), and the data string read out from the data string memory 211 is supplied to the CPU 10. In the above-described steps of procedure, for the operation of retrieving the data string, it can be understood that the steps ② to ⑨ do not deteriorate the throughput of the bus of the CPU because these steps are carried out in the storage device 20. FIG. 6B is a timing chart of the retrieving operation.

According to the above-described matching rules, since the variable item in the retrieval input data string GL coincides with any items, the retrieval is not required with respect to any variable item (a unit of data constituted by a variable), and the table processors corresponding to the variable items do not perform hash reading.

The algorithms of the tag number reading and collation will be described hereinafter with reference to FIG. 7C.

Symbols are defined as follows.

Ti: table processor (22i) corresponding to the i-th unit of data in the retrieval input data string GL. ($1 \leq i \leq$ number of the items (units of data) in the retrieval input data string (GL))

Sij: tag numbers for records in hash table Ti each having a hash key coinciding with the hash key generated from the i-th unit of data in the retrieval input data string GL and tag numbers for the records in hash table Ti each having a variable code, in which the number of the units of data (the first index data) contained in the each record is equal to the number of the units of data (third index data) in the data string GL.

{Si}: set of Sij.

As described above, since the unit of data, which is a variable, coincides with any unit of data, table processor Ti does not take part in the tag number collation when the unit of data included in one of the records in the hash table, which is in charge of the table processor Ti, turns out to be a variable as a result of the division of the data string GL into units of data. When table processor Ti for which set {Si} is an empty set exists, a tag being common to all of the Ti will not exist, so that any data string pattern-matching the data string GL is not stored in the storage device 20. Therefore, there is no data string to be read out. When the {Si} is not an empty set in all of the Ti, the tag numbers are collated in accordance with the following algorithm, for example.

(7-1) Each Ti delivers the smallest one Sij of the {Si} to the control means 21.

(7-2) The control means 21 examines or checks coincidence of the values of all of the Sij supplied from the Ti. If the value of the Sij does not coincide, the procedure goes to step (7-6).

(7-3) By the use of coincident Sij, a data string is obtained from the data string memory 211 through the tag directory memory 215, and is supplied to the CPU 10 (a pattern-matching data string found).

(7-4) The control means 21 informs each Ti of the coincidence of the Sij (for next retrieval).

(7-5) Each Ti delivers the next smallest Sij, which is larger than the Sij delivered immediately before, to the control means 21. If the next smallest Sij does not exist, the procedure goes to step (7-8).

(7-6) The control means 21 informs each Ti of the largest Sij of the Sij delivered from each Ti.

(7-7) Each Ti retrieves the smallest Sij in the {Si} larger than informed Sij in the hash table 230. If the smallest one Sij exists, each Ti delivers the smallest Sij to the control means 21, and the procedure goes to step (7-2).

(7-8) The Ti for which the Sij does not exist informs the control means 21 of non-existence of the Sij. At this step, it is apparent that no further pattern-matching data string does not exist, so that the control means 21 informs all Ti of the end of the retrieval to terminate the reading operation.

Figures 7A, 7B:
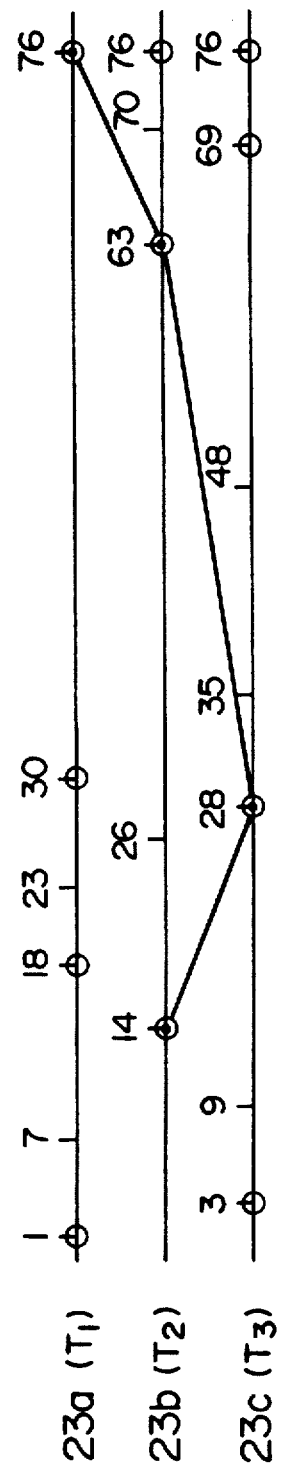
FIGS. 7A, 7B and 7C are diagrams showing steps of procedure of retrieving tag numbers in the storage device according to one embodiment of the present invention.
Figure 7C:
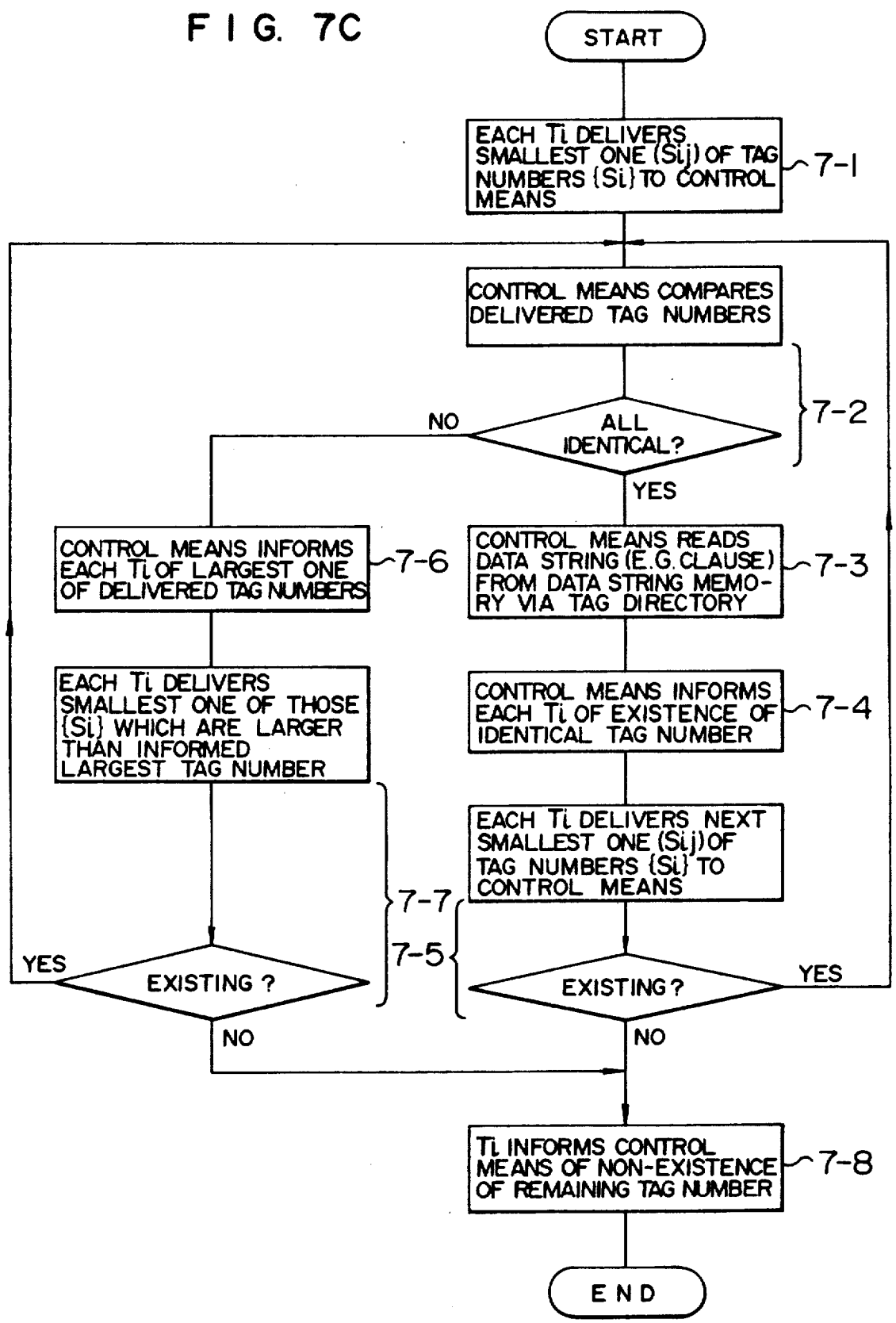

FIGS. 7A and 7B show a specific example of the tag number matching collation carried out by the control means 21. In FIGS. 7A and 7B, only three table processors 23a to 23c are shown to simplify for the sake of simplicity of explanation. Firstly, set IT-1 of "1", "14" and "3", which are the smallest ones of the Sij, are delivered to the control means from respective table processors (7-1). Since these (1, 14, 3) do not coincide with each other, the control means returns (IT-1) max "14", which is the largest one of the Sij, to all table processors 23a to 23c (7-6), and table processors read out set IT-2 of "18", "14" and "28" which are the smallest ones of those which are not smaller than "14" (7-7). At this time, as shown by numeral lines in FIG. 7B, the Sij of the table processors 23a ($T_1$) and 23c ($T_3$) or "7" and "9" are not read out, and the control means finally finds out a set of "76", "76" and "76" (IT-5) of the Sij along the solid line as shown in FIG. 7B.

Since the next retrieval in the hash table is carried out with the largest one of the Sij in a case that the tag numbers do not coincide with each other, the number of times of collations until finding of the same or common tag numbers can be minimized. Further, the reading of unnecessary tag numbers can be restricted greatly, and the high speed of parallel retrieval is fully enjoyed.

Figure 8:
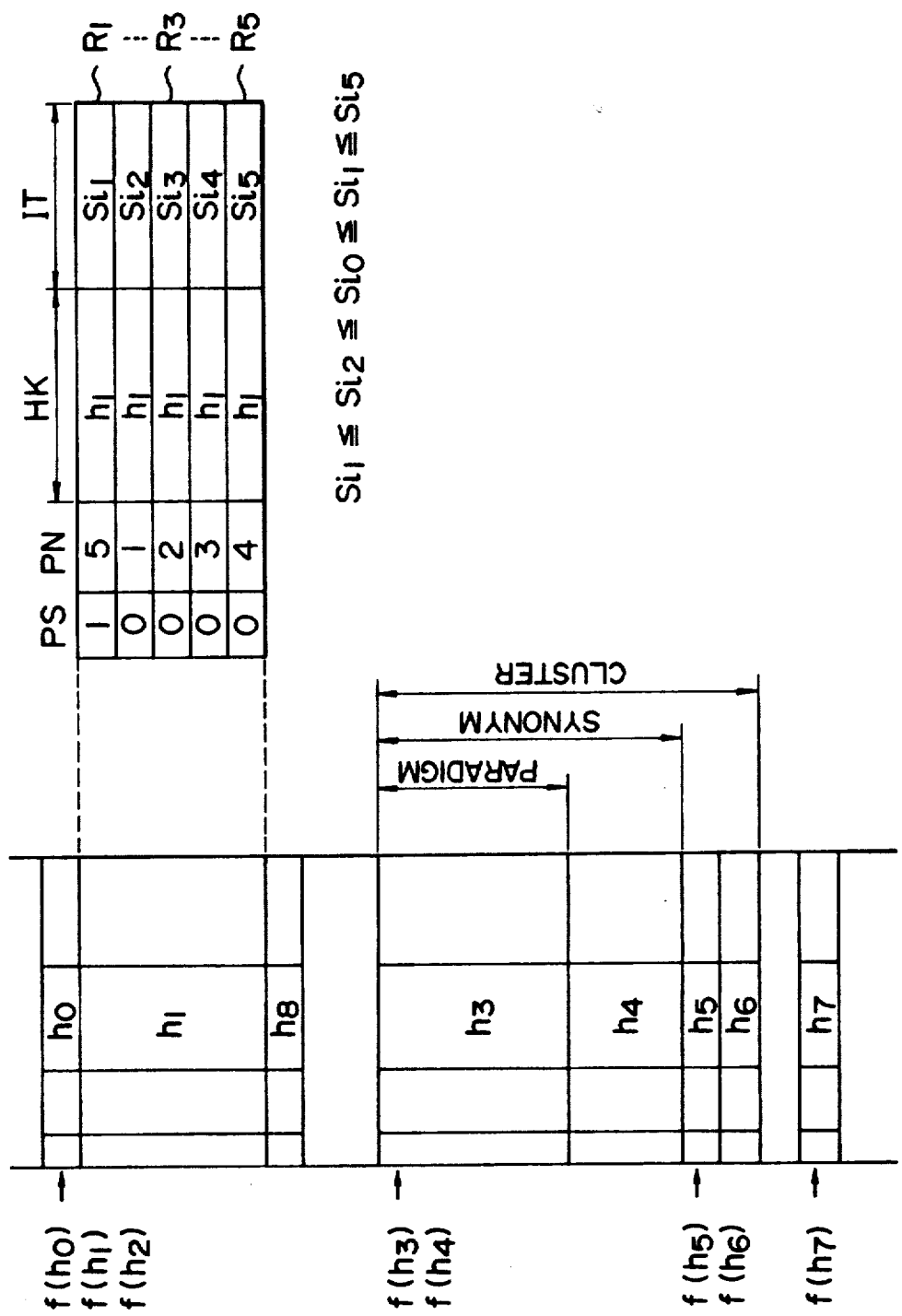
FIG. 8 is a diagram showing a manner of storing data in respective hash tables in the storage device according to one embodiment of the present invention.

FIG. 8 shows the storage form of the data in the hash tables stored in the memory sections 23a, . . . , 23n. As can be understood from the illustration in FIGS. 2, 5A and 6A, several records having the same hash key may exist in one hash table. The retrieval of the Sij may be carried out in such hash table. If the storage locations of these records are mixed with the storage locations of those records (synonyms) having the same hash function or hash address, the retrieval efficiency will be lowered. Therefore, the records having same hash keys and same hash addresses are stored collectively in the hash table. This collection of stored records is called a paradigm.

In the retrieval of a tag number in each hash table, a hash address is produced from a retrieval key so that the start of a paradigm corresponding to the hash address is found, and then the tag number may be read out in accordance with the above-described algorithm. If the paradigm exists in a cluster in the hash table, the hash function value (hash address) does not alway represent the start of the objective paradigm. To find the start of the paradigm speedily, a start mark PS and a mark PN indicative of a distance from the start (when a record is not at the start of a paradigm) or the total number of records in a paradigm (when a record is at the start of a paradigm) are added to each of the records $R_1, R_2, \ldots$. Namely, the hash address is obtained from the hash function, and the start address of the nearest paradigm is obtained on the basis of the distance information, and the start of the objective paradigm is found by tracing only the starts of paradigms on the basis of the information on the total number of the records.

Further, the records are arranged in a descending or ascending order of the tag number, for example. At the retrieval of the Sij of the step ⑦ (FIGS. 6A, 6B) in the tag collation algorithm, an efficient binary search can be used owing to the above-mentioned arrangement of records and the information on the total number of the records.

The above-described storage form is efficient at the retrieval. According to the storage form, however, a great amount of the data must be moved when new data strings are recorded and data are deleted. However, since the movement of these data is carried out independently of the CPU, the throughput of the whole system is not deteriorated when the frequencies of the data read and deletion are lower than a predetermined value.

Figure 9A:
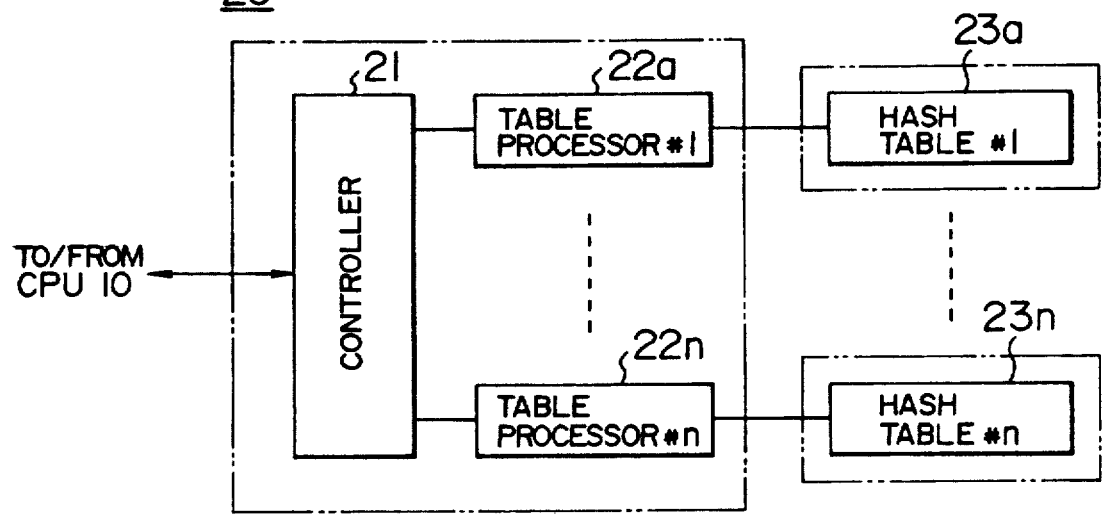
FIGS. 9A and 9B are diagrams showing a storage device according to another embodiment of the present invention.
Figure 9B:
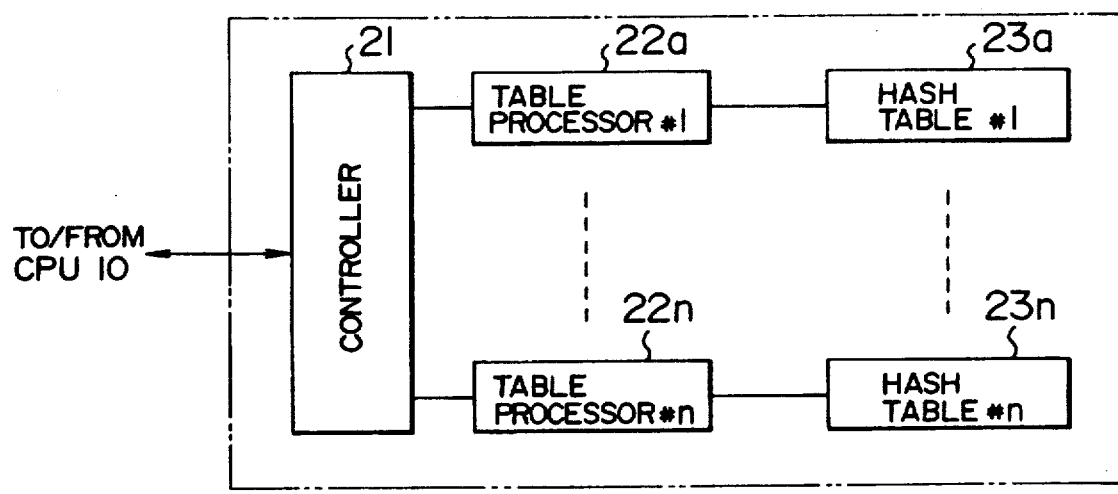

FIGS. 9A and 9B show how to integrate members to form each single chip (two dotted line showing the single chip) when the data storage device 20 according to one embodiment of the invention is implemented in an IC form. The construction as shown in FIG. 9A includes three chips which are useful to easily enlarge the capacities of the hash tables (memory sections) 23a, . . . , 23n. On the other hand, the construction as shown in FIG. 9B consists of a single chip, and is useful for a high speed data retrieval.

FIG. 10 is a block diagram of the data storage/retrieval system according to another embodiment of the present invention. In this embodiment, for example, two storage devices 20-I and 20-II are arranged in parallel with respect to a single CPU 10. The structures of the two stroage devices 20-I and 20-II are substantially equal to those of the storage device 20 shown in FIG. 3. This construction is useful for the system having the capacity capable of storing a great amount of the data base.

We claim:

1. A data storage device for storing therein data strings each including units of data, comprising:

memory means having a plurality of memory sections;

a plurality of processor elements one provided for each of said memory sections, said processor elements being arranged for parallel access to their associated memory sections for data storage and data retrieval; and control means having an internal memory and a controller, said controller serving for data storage, and including a write means to write data strings supplied from a central processing unit to the data storage device in said internal memory, first dividing means to divide each of said data strings into units of data and, generating means to generate a first index data representing the number of units of data of said data string and a second index data unique to said data string, said processor elements being controlled by a processor element control means of said control means to write said units of data along with corresponding first and second index data in their associated memory sections by said parallel access for data storage so that a retrieval means retrieves said written units of data in terms of said first and second index data in respective memory sections by said parallel access for data retrieval, said controller further serving for data retrieval, and further including a second dividing means to divide a data string supplied to the data storage device into units of data, transfer means to transfer the divided units of data to said processor elements for retrieval in their associated memory sections of second index data corresponding to said units of data, detecting means to detect a single common second index data among said retrieved index data and output means to output from said internal memory a data string corresponding to the detected common second index data.

2. A data storage device according to claim 1, in which combinations of a divided unit of data and a first index data written in each of said memory sections are arranged such that combinations having units of data and index data identical with one another are located adjacent to one another in each memory section.

3. A data storage device for storing therein data strings each including units of data, comprising:

memory means having a plurality of memory sections each storing therein a hash table;

a plurality of table processors one provided for each of said hash tables, said table processors being arranged for parallel access to their associated memory sections for data storage and data retrieval; and control means having an internal memory and a controller, said controller serving for data storage, and including a write means to write data strings supplied from a central processing unit to the data storage device in said internal memory, first dividing means to divide each of said data strings into units of data and generating means to generate a first index data representing the number of units of data of said data string and a second index data unique to said data string, said table processors being controlled by a table processor control means of said control means to write said units of data along with corresponding first and second index data in their associated hash tables in said memory sections by said parallel access for data storage so that a retrieval means retrieves said written units of data in terms of said first and second index data in respective hash tables by said parallel access for data retrieval, said controller further serving for data retrieval, and further including a second dividing means to divide a data string supplied to the data storage device into units of data, transfer means to transfer the divided units of data to said table processors for retrieval in their associated hash tables in said memory sections of second index data corresponding to said units of data, detecting means to detect a single common second index data among said retrieved second index data and output from said internal memory a data string corresponding to the detected common second index data.

4. A system for storing and retrieving data strings each including units of data, comprising:

a central processing unit; and a data storage unit for storing therein data strings, said central processing unit being coupled to said data storage unit for storing and retrieving data strings therein, said data storage unit including, memory means having a plurality of memory sections, a plurality of processor elements one provided for each of said memory sections, said processor elements being arranged for parallel access to their associated memory sections for data storage and data retrieval, and control means having an internal memory and a controller, said controller serving for data storage, and including a write means to write data strings supplied from said central processing unit to said data storage unit in said internal memory, first dividing means to divide each of said data strings into units of data and generating means to generate a first index data representing the number of units of data of a data string and a second index data unique to a data string, said processor elements being controlled by a processor element control means of said control means to write said units of data along with corresponding first and second index data in their associated memory sections by said parallel access for data storage so that a retrieval means retrieves said written units of data in terms of said first and second index data in respective memory sections by said parallel access for data retrieval, said controller further serving for data retrieval, and further including a second dividing means to divide a data string supplied from said central processing unto to said data storage unit into units of data, transfer means to transfer the units of data to said processor elements for retrieval in their associated memory sections of second index data corresponding to said units of data, detecting means to detect a single common second index data among said retrieved second index data and output means to output, from said internal memory to said central processing unit, a data string corresponding to the detected common second index data.

5. A method of storing data strings in a data storage device, each of said data strings including units of data, the method comprising the steps of:

storing by a storing means, an inputted data string in a first portion of said storage device;

dividing by a dividing means of said storage device, said inputted data string into units of data and attaching a first index data to each of said divided units of data, said first index data representing the number of units of data included in that data string which said each unit of data constitutes;

generating by a generating means of said storage device, a second index data for said inputted data string, said second index data being unique to each data string, and producing records each including a unit of data, a first index data and a second index data; and accessing in parallel, by an accessing means of said storage devices, individual memory sections to store said records therein in a second portion of said storage device, said memory sections being always responsible for units of data in predetermined locations in data strings.

6. A method of storing and retrieving data strings in a data storage device, each of said data strings including units of data, the method comprising the steps of:

storing by a storing means, an inputted data string for storage in a first portion of said storage device;

dividing by a first dividing means, said inputted data string for storage into units of data and attaching a first index data to each of said divided units of data, said first index data representing the numbers of units of data included in that data string which said each unit of data constitutes;

generating by a generating means, a second index data for said inputted data string for storage, said second index data being unique to each data string, and producing records each including a unit of data, a first index data and a second index data;

accessing in parallel, by an accessing means, individual memory sections to store said records therein in a second portion of said storage device, said memory sections being always responsible for units of data in predetermined locations in data strings;

dividing by a second dividing means, an inputted data string for retrieval into units of data, detecting the number of units of data included in said inputted data string for retrieval and producing retrieval keys each including a combination of one of said divided units of data and a third index data representing the detected number of units of data;

retrieving in parallel, by a retrieving means, second index data in said memory sections in said second part of said data storage device with said retrieval keys;

detecting by a detecting means, a single second index data common to all of the retrieved second index data among them; and outputting by an outputting means, a data string corresponding to said detected single common index data from said first portion of said storage device to a central processing unit.

7. A method according to claim 6, in which the retrieved second index data in said parallel retrieving step are those in records having first index data and units of data identical with said third index data and said divided units of data of said inputted data string for retrieval, respectively, and are those in records having first index data identical with said third index data of said inputted data string for retrieval and variables.

8. A method according to claim 6, in which said step of parallel retrieving second index data in said memory sections in said second part of said data storage device with said retrieval keys is carried out with predetermined matching rules.

* * * * *

UNITED STATES PATENT AND TRADEMARK OFFICE
CERTIFICATE OF CORRECTION

PATENT NO. : 5,129,074
DATED : July 7, 1992
INVENTOR(S) : Takashi Kikuchi, et al.

It is certified that error appears in the above-identified patent and that said Letters Patent is hereby corrected as shown below:

Claim 4, column 12, line 8, delete "unto" and replace with --unit--.

Claim 6, column 12, line 51, delete "numbers" and replace with --number--.

Signed and Sealed this

Tenth Day of August, 1993

Attest:

MICHAEL K. KIRK

Attesting Officer

Acting Commissioner of Patents and Trademarks